US011112919B2

(12) United States Patent
Gu et al.

(10) Patent No.: US 11,112,919 B2
(45) Date of Patent: Sep. 7, 2021

(54) MUTUAL CAPACITIVE TOUCH SUBSTRATE, DISPLAY APPARATUS, TOUCH PANEL, METHOD OF DRIVING MUTUAL CAPACITIVE TOUCH SUBSTRATE, AND DRIVER CIRCUIT

(71) Applicants: BOE Technology Group Co., Ltd., Beijing (CN); Hefei BOE Optoelectronics Technology Co., Ltd., Anhui (CN)

(72) Inventors: Honggang Gu, Beijing (CN); Junsheng Chen, Beijing (CN); Xianjie Shao, Beijing (CN); Jie Song, Beijing (CN)

(73) Assignees: BOE Technology Group Co., Ltd., Beijing (CN); Hefei BOE Optoelectronics Technology Co., Ltd., Anhui (CN)

( * ) Notice: Subject to any disclaimer, the term of this patent is extended or adjusted under 35 U.S.C. 154(b) by 514 days.

(21) Appl. No.: 16/080,936

(22) PCT Filed: Aug. 14, 2017

(86) PCT No.: PCT/CN2017/097368
§ 371 (c)(1),
(2) Date: Aug. 29, 2018

(87) PCT Pub. No.: WO2019/033234
PCT Pub. Date: Feb. 21, 2019

(65) Prior Publication Data
US 2021/0191567 A1    Jun. 24, 2021

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05);
(Continued)

(58) Field of Classification Search
CPC .. G06F 3/0412; G06F 3/04164; G06F 3/0445; G06F 3/0446
(Continued)

(56) References Cited

U.S. PATENT DOCUMENTS 10,684,720 B2 * 6/2020 Ding ................ G06F 3/0446
10,712,847 B2 * 7/2020 Kim ................ G06F 3/0412
(Continued)

FOREIGN PATENT DOCUMENTS

| CN | 103309534 A | 9/2013 |
| CN | 103399679 A | 11/2013 |

(Continued)

OTHER PUBLICATIONS

International Search Report & Written Opinion dated May 22, 2018, regarding PCT/CN2017/097368.
(Continued)

*Primary Examiner* — Calvin C Ma
(74) *Attorney, Agent, or Firm* — Intellectual Valley Law, P.C.

(57) ABSTRACT

The present application discloses a mutual capacitive touch substrate having a matrix of a plurality of touch electrode blocks along a first direction and a second direction. The plurality of touch electrode blocks are grouped into a plurality of touch control repeating units. Each of the plurality of touch control repeating units includes a touch sensing electrode, one or more first touch scanning electrodes on a first side of the touch sensing electrode, and one or more second touch scanning electrodes on a second side of the touch sensing electrode, the first side is different from the second side. The touch sensing electrode abuts at least a portion of each of the one or more first touch scanning electrodes and at least a portion of each of the one or more second touch scanning electrodes. The plurality of touch (Continued)

control repeating units are electrically insulated from each other.

18 Claims, 6 Drawing Sheets

(52) U.S. Cl.
CPC ........ *G06F 3/0445* (2019.05); *G06F 3/04164* (2019.05); *G06F 3/041661* (2019.05); *G06F 3/041662* (2019.05); *G06F 2203/04111* (2013.01)

(58) Field of Classification Search
USPC .................................................. 345/173, 174
See application file for complete search history.

(56) References Cited

U.S. PATENT DOCUMENTS

| | | |
|---|---|---|
| 2012/0056835 A1 | 3/2012 | Choo et al. |
| 2014/0168151 A1 | 6/2014 | Noguchi et al. |
| 2014/0313169 A1* | 10/2014 | Kravets .............. G01R 27/2605 345/178 |
| 2014/0354572 A1 | 12/2014 | Zhao et al. |
| 2015/0049258 A1 | 2/2015 | Qiu et al. |
| 2016/0154496 A1 | 6/2016 | Qiu et al. |
| 2016/0246433 A1* | 8/2016 | Lee ........................ G06F 3/0412 |
| 2016/0349889 A1 | 12/2016 | Yang et al. |

FOREIGN PATENT DOCUMENTS

| | | |
|---|---|---|
| CN | 103399681 A | 11/2013 |
| CN | 104503633 A | 4/2015 |
| CN | 105094485 A | 11/2015 |
| JP | 2012059265 A | 3/2012 |
| JP | 2014119919 A | 6/2014 |
| JP | 2016197400 A | 11/2016 |

OTHER PUBLICATIONS

First Office Action in the Japanese Patent Application No. 2018564906, dated May 11, 2021; English translation attached.

* cited by examiner

MUTUAL CAPACITIVE TOUCH SUBSTRATE, DISPLAY APPARATUS, TOUCH PANEL, METHOD OF DRIVING MUTUAL CAPACITIVE TOUCH SUBSTRATE, AND DRIVER CIRCUIT

CROSS-REFERENCE TO RELATED APPLICATION

This application is a national stage application under 35 U.S.C. § 371 of International Application No. PCT/CN2017/097368, filed Aug. 14, 2017, the contents of which are incorporated by reference in the entirety.

TECHNICAL FIELD

The present invention relates to display technology, more particularly, to a mutual capacitive touch substrate, a mutual capacitive touch control display apparatus, a mutual capacitive touch panel, a method of driving a mutual capacitive touch substrate, and a driver circuit for driving a mutual capacitive touch control display apparatus.

BACKGROUND

Touch control display panels have found a wide range of applications in the display field such as mobile phones, computer display panels, touch screens, satellite navigation devices, and digital cameras. Touch control display panels can be categorized into three classes: add-on type touch panels, on-cell type touch panels, and in-cell touch type panels. Touch control display panels may be a self-capacitive type or a mutual capacitive type touch display panel. Touch control display panels may use mesh electrodes as the touch electrodes or use metal oxide materials (e.g., indium tin oxide) as the touch electrode material.

SUMMARY

In one aspect, the present invention provides a mutual capacitive touch substrate having a matrix of a plurality of touch electrode blocks along a first direction and a second direction, the plurality of touch electrode blocks grouped into a plurality of touch control repeating units; wherein each of the plurality of touch control repeating units comprises a touch sensing electrode, one or more first touch scanning electrodes on a first side of the touch sensing electrode, and one or more second touch scanning electrodes on a second side of the touch sensing electrode, the first side is different from the second side; the touch sensing electrode abuts at least a portion of each of the one or more first touch scanning electrodes and at least a portion of each of the one or more second touch scanning electrodes; and the plurality of touch control repeating units are electrically insulated from each other.

Optionally, the touch sensing electrode comprises a plurality of touch sensing electrode blocks electrically connected together, each of the one or more first touch scanning electrodes and each of the one or more second touch scanning electrodes comprise a plurality of touch scanning electrode blocks; the plurality of touch scanning electrode blocks in each of the one or more first touch scanning electrodes are electrically connected together; the plurality of touch scanning electrode blocks in each of the one or more second touch scanning electrodes are electrically connected together; the one or more first touch scanning electrodes are electrically insulated from each other; and the one or more second touch scanning electrodes are electrically insulated from each other.

Optionally, at least one of the plurality of touch scanning electrode blocks in each of the one or more first touch scanning electrodes abuts one of the plurality of touch sensing electrode blocks in the touch sensing electrode; and at least one of the plurality of touch scanning electrode blocks in each of the one or more second touch scanning electrodes abuts one of the plurality of touch sensing electrode blocks in the touch sensing electrode.

Optionally, the touch sensing electrode further comprises a plurality of touch sensing electrode bridges electrically connecting the plurality of touch sensing electrode blocks; each of the one or more first touch scanning electrodes and each of the one or more second touch scanning electrodes further comprise a plurality of touch scanning electrode bridges; the plurality of touch scanning electrode blocks in each of the one or more first touch scanning electrodes are electrically connected together by one or more of the plurality of touch scanning electrode bridges; the plurality of touch scanning electrode blocks in each of the one or more second touch scanning electrodes are electrically connected together by one or more of the plurality of touch scanning electrode bridges; and the plurality of touch sensing electrode blocks, the plurality of touch sensing electrode bridges, the plurality of touch scanning electrode bridges, the plurality of touch scanning electrode blocks in the one or more first touch scanning electrodes and the one or more second touch scanning electrodes are in a same layer.

Optionally, the mutual capacitive touch substrate comprises a plurality of subpixel areas; each of the plurality of touch sensing electrode blocks is in one of the plurality of subpixel areas; and each of the plurality of touch scanning electrode blocks is in one of the plurality of subpixel areas.

Optionally, the touch sensing electrode, the one or more first touch scanning electrodes, and the one or more second touch scanning electrodes are operated in a time-division driving mode; the time-division driving mode comprises a display mode and a touch control mode; the touch sensing electrode, the one or more first touch scanning electrodes, and the one or more second touch scanning electrodes are common electrodes for applying a common voltage signal during the display mode; and the touch sensing electrode, the one or more first touch scanning electrodes, and the one or more second touch scanning electrodes are touch control electrodes for conducting touch signals during the touch control mode.

Optionally, the touch sensing electrode extends substantially along the first direction; and the one or more first touch scanning electrodes, the touch sensing electrode, the one or more second touch scanning electrodes are arranged substantially along the second direction.

Optionally, one of the one or more first touch scanning electrodes extends substantially along the first direction over a distance substantially the same as the touch sensing electrode; and one of the one or more second touch scanning electrodes extends substantially along the first direction over the distance substantially the same as the touch sensing electrode.

Optionally, the touch sensing electrode comprises a first portion and a second portion substantially along the first direction; a first one of the one or more first touch scanning electrodes abuts the first portion of the touch sensing electrode and a second one of the one or more first touch scanning electrodes abuts the second portion of the touch sensing electrode; and a first one of the one or more second touch scanning electrodes abuts the first portion of the touch sensing electrode and a second one of the one or more second touch scanning electrodes abuts the second portion of the touch sensing electrode.

Optionally, the one or more first touch scanning electrodes comprise a first electrode, a second electrode, and a third electrode sequentially along the second direction; the one or more second touch scanning electrodes comprise a fourth electrode, a fifth electrode, and a sixth electrode sequentially along the second direction; the touch sensing electrode comprises a first portion, a second portion and a third portion sequentially along the first direction; the third portion abuts the first electrode and the sixth electrode; the second portion abuts the second electrode and the fifth electrode; and the first portion abuts the third electrode and the fourth electrode.

Optionally, the mutual capacitive touch substrate further comprises a plurality of touch sensing signal lines and a plurality of touch scanning signal lines; the touch sensing electrode is electrically connected to one of the plurality of touch sensing signal lines; each of the one or more first touch scanning electrodes is electrically connected to one of the plurality of touch scanning signal lines; and each of the one or more second, touch scanning electrodes is electrically connected to one of the plurality of touch scanning signal lines.

Optionally, a ratio between a total number of the plurality of touch sensing signal lines and a total number of the plurality of touch scanning signal lines is 1:2N, N is an integer ≥1.

In another aspect, the present invention provides a mutual capacitive touch control display apparatus comprising the mutual capacitive touch substrate described herein.

In another aspect, the present invention provides a mutual capacitive touch panel comprising the mutual capacitive touch substrate described herein.

In another aspect, the present invention provides a method of driving the mutual capacitive touch substrate described herein; comprising applying one or more first touch scanning signals respectively to the one or more first touch scanning electrodes.

Optionally, the one or more first touch scanning signals are applied in a first touch scanning period; the method further comprises applying one or more second touch scanning signals respectively to the one or more second touch scanning electrodes in a second touch scanning period, the second touch scanning period is later in time than the first touch scanning period.

Optionally, the method further comprises applying one or more second touch scanning signals respectively to the one or more second touch scanning electrodes; wherein the one or more first touch scanning signals and the one or more second touch scanning signals are in phase and are applied simultaneously.

Optionally, the method further comprises applying one or more ground signals respectively to the one or more second touch scanning electrodes; wherein the one or more first touch scanning signals and the one or more ground signals are applied simultaneously.

Optionally, the touch sensing electrode, the one or more first touch scanning electrodes, and the one or more second touch scanning electrodes are operated in a time-division driving mode; the time-division driving mode comprises a display mode and a touch control mode; the method comprises applying common voltage signal during the display mode to the touch sensing electrode, the one or more first touch scanning electrodes, and the one or more second touch scanning electrodes; and applying the one or more first touch scanning signals respectively to the one or more first touch scanning electrodes during the touch control mode.

In another aspect, the present invention provides a driver circuit for driving a mutual capacitive touch control display apparatus described herein, wherein the touch sensing electrode, the one or more first touch scanning electrodes, and the one or more second touch scanning electrodes are operated in a time-division driving mode; the time-division driving mode comprises a display mode and a touch control mode; the driver circuit comprises circuitry configured to apply common voltage signal during the display mode to the touch sensing electrode, the one or more first touch scanning electrodes, and the one or more second touch scanning electrodes; and apply one or more first touch scanning signals respectively to the one or more first touch scanning electrodes during the touch control mode.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional touch substrates and touch panels, the presence of touch electrodes and touch signal lines severely limit the aperture ratio of the conventional touch substrates and touch panels. Moreover, the touch detection in the conventional touch substrates and touch panels is often interfere by the data lines and gate lines due to the layout of the touch electrodes, resulting in erroneous touch detection.

Further, some conventional touch substrates and touch panels include a plurality of touch signal lines electrically connected with the touch electrode blocks. An additional patterning process is required to form the plurality of touch signal lines. The presence of the plurality of touch signal lines also affect aperture ration of the display panel.

Accordingly, the present disclosure provides, inter alia, a mutual capacitive touch substrate, a mutual capacitive touch control display apparatus, a mutual capacitive touch panel, a method of driving a mutual capacitive touch substrate, and a driver circuit for driving a mutual capacitive touch control display apparatus that substantially obviate one or more of the problems due to limitations and disadvantages of the related art. In one aspect, the present disclosure provides a mutual capacitive touch substrate having a matrix of a plurality of touch electrode blocks along a first direction and a second direction. The plurality of touch electrode blocks are grouped into a plurality of touch control repeating units. In some embodiments, each of the plurality of touch control repeating units includes a touch sensing electrode, one or more first touch scanning electrodes on a first side of the touch sensing electrode, and one or more second touch scanning electrodes on a second side of the touch sensing electrode, the first side being different from the second side. Optionally, the touch sensing electrode abuts at least a portion of each of the one or more first touch scanning electrodes and at least a portion of each of the one or more second touch scanning electrodes. Optionally, the plurality of touch control repeating units are electrically insulated from each other.

Figure 1:
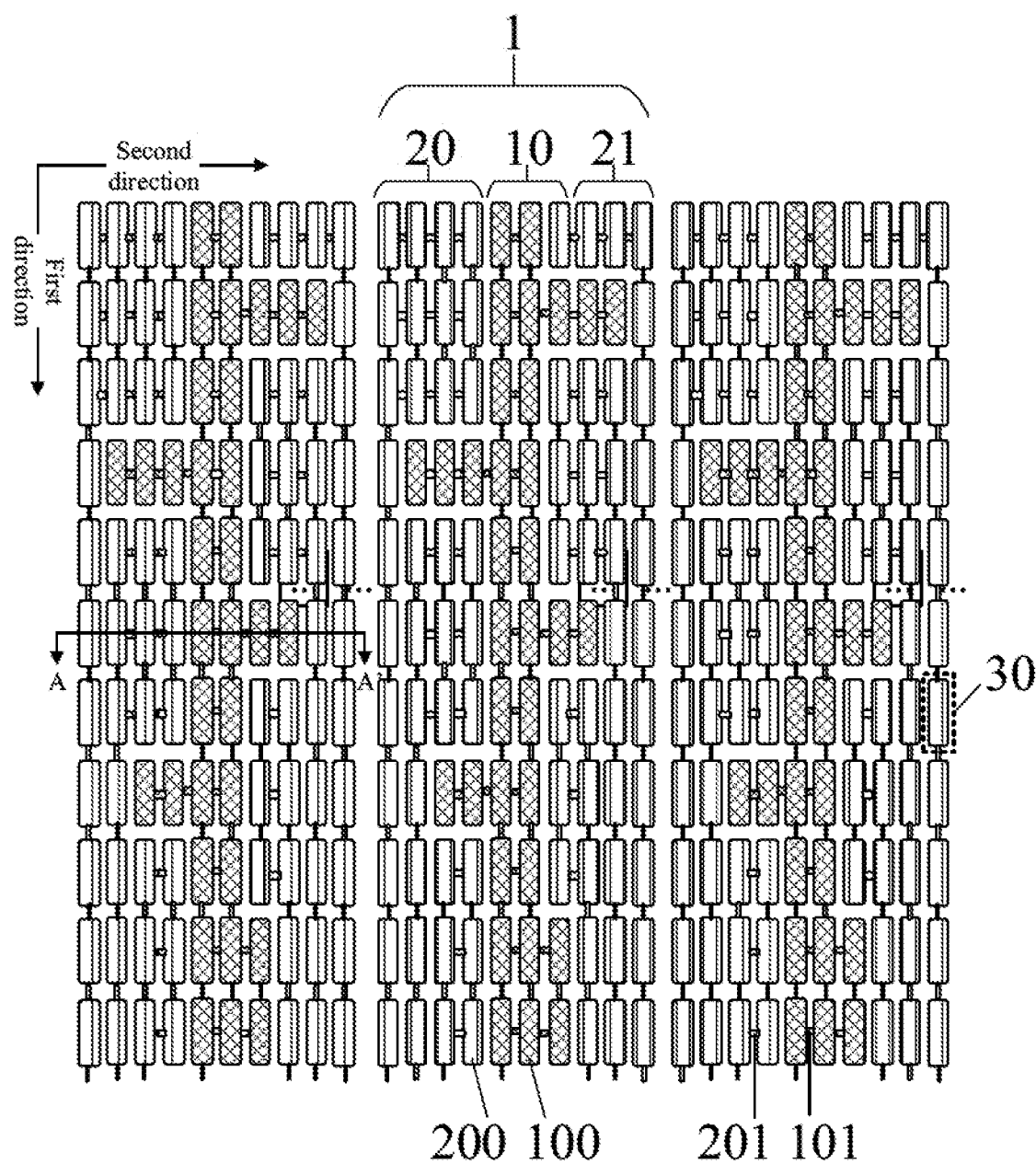
FIG. 1 is a schematic diagram illustrating the structure of a mutual capacitive touch substrate in some embodiments according to the present disclosure.

FIG. 1 is a schematic diagram illustrating the structure of a mutual capacitive touch substrate in some embodiments according to the present disclosure. Referring to FIG. 1, the mutual capacitive touch substrate in some embodiments includes a matrix of a plurality of touch electrode blocks, such as a plurality of touch scanning electrode blocks 100 and a plurality of touch sensing electrode blocks 200, along a first direction and a second direction. As shown in FIG. 1, the plurality of touch electrode blocks can be grouped into a plurality of touch control repeating units 1. Each of the plurality of touch control repeating units 1 is the minimal repeating unit of the matrix of a plurality of touch electrode blocks in the mutual capacitive touch substrate. FIG. 1 illustrates three of the plurality of touch control repeating units 1 repeated substantially along the second direction. Optionally, the plurality of touch electrode blocks can be repeated along the first direction as well.

In some embodiments, each of the plurality of touch control repeating units 1 includes a touch sensing electrode 10, one or more first touch scanning electrodes 20 on a first side of the touch sensing electrode 10, and one or more second touch scanning electrodes 21 on a second side of the touch sensing electrode 10. The first side is different from the second side, e.g., the first side is a side opposite to the second side. By having the present electrode layout, the mutual capacitive touch substrate is compatible for use in multiple touch detection modes.

In some embodiments, the mutual capacitive touch substrate is operated in a first touch detection mode (e.g., a relatively high-resolution touch detection mode). When a touch event occurs, the touch sensing electrode 10 detects a touch position based on a capacitance change in the touch electrodes. In a first touch scanning period, one or more first touch scanning signals are respectively provided to the one or more first touch scanning electrodes 20. By determining the locations of the touch sensing electrode 10 and the one or more first touch scanning electrodes 20 that produce the capacitance change, a touch position may be determined to have a first coordinate, e.g., (X1, Y1). In a second touch scanning period, one or more second touch scanning signals are respectively provided to the one or more second touch scanning electrodes 21. By determining the locations of the touch sensing electrode 10 and the one or more second touch scanning electrodes 21 that produce the capacitance change, the touch position may be determined for the second time to have a second coordinate, e.g., (X2, Y2). Because the touch position for a same touch event is independently determined twice, the touch position can be determined with much enhanced precision.

In some embodiments, the mutual capacitive touch substrate is operated in a second touch detection mode (e.g., a relatively low-resolution touch detection mode). In a same touch scanning period, one or more first touch scanning signals are respectively provided to the one or more first touch scanning electrodes 20, and one or more second touch scanning signals are respectively provided to the one or more second touch scanning electrodes 21, The one or more first touch scanning signals and the one or more second touch scanning signals are in phase and are applied simultaneously.

In some embodiments, the mutual capacitive touch substrate is operated in a third touch detection mode (e.g., a relatively low-resolution touch detection mode). In a same touch scanning period, one or more first touch scanning signals are respectively provided to the one or more first touch scanning electrodes 20, and one or more ground signals are respectively provided to the one or more second touch scanning electrodes 21. The one or more first touch scanning signals and the one or more ground signals are applied simultaneously.

In the low-resolution touch detection modes (e.g., the second touch detection mode and the third touch detection mode), the adverse coupling effects among the touch electrodes can be reduced. Moreover, by having two sets of touch scanning electrodes, the mutual capacitive touch substrate can continue to detect a touch in the event one of the two sets of touch scanning electrodes is damaged.

Further, in some embodiments, the touch sensing electrode 10, the one or more first touch scanning electrodes 20, and the one or more second touch scanning electrodes 21 are operated in a time-division driving mode. The time-division driving mode includes a display mode and a touch control mode (e.g., the first touch detection mode, the second touch detection mode, or the third touch detection mode). The touch sensing electrode 10, the one or more first touch scanning electrodes 20, and the one or more second touch scanning electrodes 21 are common electrodes for applying common voltage signal during the display mode. The touch sensing electrode 10, the one or more first touch scanning electrodes 20, and the one or more second touch scanning electrodes 21 are touch control electrodes for conducting touch signals during the touch control mode.

Referring to FIG. 1, in some embodiments, the touch sensing electrode 10 abuts at least a portion of each of the one or more first touch scanning electrodes 20 and at least a portion of each of the one or more second touch scanning electrodes 21. By having this design, a touch position may be independently determined by detecting a capacitance change between each of the one or more first touch scanning electrodes 20 and the touch sensing electrode 10, and between each of the one or more second touch scanning electrodes 21 and the touch sensing electrode 10. For example, at least one of the plurality of touch scanning electrode blocks 200 in each of the one or more first touch scanning electrodes 20 abuts one of the plurality of touch sensing electrode blocks 100 in the touch sensing electrode 10. Similarly, at least one of the plurality of touch scanning electrode blocks 200 in each of the one or more second touch scanning electrodes 21 abuts one of the plurality of touch sensing electrode blocks 100 in the touch sensing electrode 10. The plurality of touch control repeating units 1 are electrically insulated from each other so that touch detection in each of the plurality of touch control repeating units 1 does not interfere with each other.

In some embodiments, the touch sensing electrode 10 includes a plurality of touch sensing electrode blocks 100 electrically connected together, each of the one or more first touch scanning electrodes 20 includes a plurality of touch scanning electrode blocks 200, and each of the one or more second touch scanning electrodes 21 includes a plurality of touch scanning electrode blocks 200. The plurality of touch sensing electrode blocks 100 in the touch sensing electrode 10 are electrically connected together. The plurality of touch scanning electrode blocks 200 in each of the one or more first touch scanning electrodes 20 are electrically connected together. The plurality of touch scanning electrode blocks 200 in each of the one or more second touch scanning electrodes 21 are electrically connected together. The one or more first touch scanning electrodes 20 are electrically insulated from each other, and are electrically insulated from the touch sensing electrode 10. The one or more second touch scanning electrodes 21 are electrically insulated from each other, and are electrically insulated from the touch sensing electrode 10. For example, none of the plurality of touch scanning electrode blocks 200 in each of the one or more first touch scanning electrodes 20 is electrically connected to any of the plurality of touch sensing electrode blocks 100. None of the plurality of touch scanning electrode blocks 200 in each of the one or more second touch scanning electrodes 21 is electrically connected to any of the plurality of touch sensing electrode blocks 100.

In some embodiments, the touch sensing electrode 10 further includes a plurality of touch sensing electrode bridges 101 electrically connecting the plurality of touch sensing electrode blocks 100. Optionally, each of the one or more first touch scanning electrodes 20 further includes a plurality of touch scanning electrode bridges 201. Optionally, each of the one or more second touch scanning electrodes 21 further includes a plurality of touch scanning electrode bridges 201. The plurality of touch scanning electrode blocks 200 in each of the one or more first touch scanning electrodes 20 are electrically connected together by one or more of the plurality of touch scanning electrode bridges 201. The plurality of touch scanning electrode blocks 200 in each of the one or more second touch scanning electrodes 21 are electrically connected together by one or more of the plurality of touch scanning electrode bridges 201. The plurality of touch scanning electrode bridges 201 are absent between any two of the one or more first touch scanning electrodes 20, and between any two of the one or more second touch scanning electrodes 21.

Figure 2:
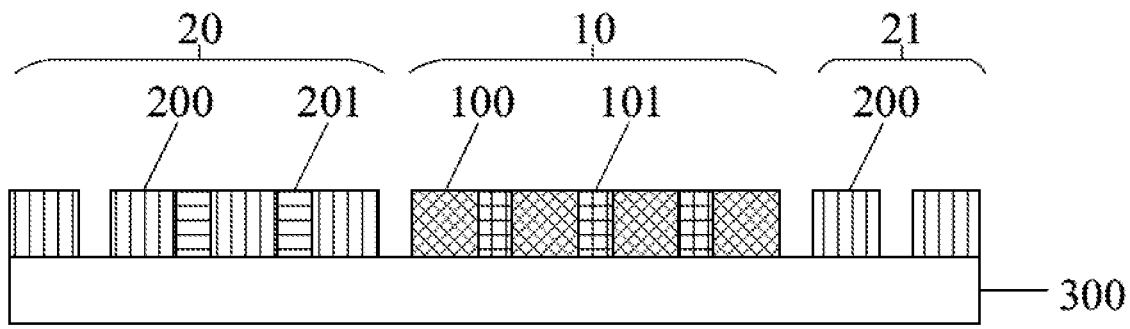
FIG. 2 is a cross-sectional view along A-A' line of the mutual capacitive touch substrate in FIG. 1 in some embodiments according to the present disclosure.

FIG. 2 is a cross-sectional view along A-A' line of the mutual capacitive touch substrate in FIG. 1 in some embodiments according to the present disclosure. Referring to FIG. 2. In some embodiments, the mutual capacitive touch substrate includes a base substrate 300, and the touch sensing electrode 10, the one or more first touch scanning electrodes 20, and the one or more second touch scanning electrodes 21 on the base substrate 300. The plurality of touch sensing electrode blocks 100, the plurality of touch sensing electrode bridges 101, the plurality of touch scanning electrode bridges 201, the plurality of touch scanning electrode blocks 200 in the one or more first touch scanning electrodes 20 and the one or more second touch scanning electrodes 21 are in a same layer. As used herein, the term "same layer" refers to the relationship between the layers simultaneously formed in the same step. In one example, electrode blocks and electrode bridges are on the same layer when the electrode blocks and electrode bridges are formed as a result of one or more steps of a same patterning process performed on a same layer of material. In another example, the electrode blocks and electrode bridges can be formed in the same layer by simultaneously performing the step of forming the electrode blocks and the step of forming the electrode bridges. The term "same layer" does not always mean that the thickness of the layer or the height of the layer in a cross-sectional view is the same.

By having the plurality of touch sensing electrode blocks 100, the plurality of touch sensing electrode bridges 101, the plurality of touch scanning electrode bridges 201, the plurality of touch scanning electrode blocks 200 in the one or more first touch scanning electrodes 20 and the one or more second touch scanning electrodes 21 all formed in a same layer using a single mask plate in a single patterning process, the fabricating process can be simplified by reducing the number of patterning steps and the number of mask plates.

Optionally, the plurality of touch sensing electrode blocks 100, the plurality of touch scanning electrode blocks 200 in the one or more first touch scanning electrodes 20, and the plurality of touch scanning electrode blocks 200 in the one or more second touch scanning electrodes 21 are made of a transparent electrode material such as indium tin oxide. Having electrode blocks made of the transparent material enhances aperture ratio of the mutual capacitive touch substrate. Moreover, the plurality of touch sensing electrode bridges 101, the plurality of touch scanning electrode bridges 201 in the one or more first touch scanning electrodes 20, and the plurality of touch scanning electrode bridges 201 in the one or more second touch scanning electrodes 21 are made of a transparent electrode material such as indium tin oxide, further improving aperture ratio of the mutual capacitive touch substrate.

Figure 3:
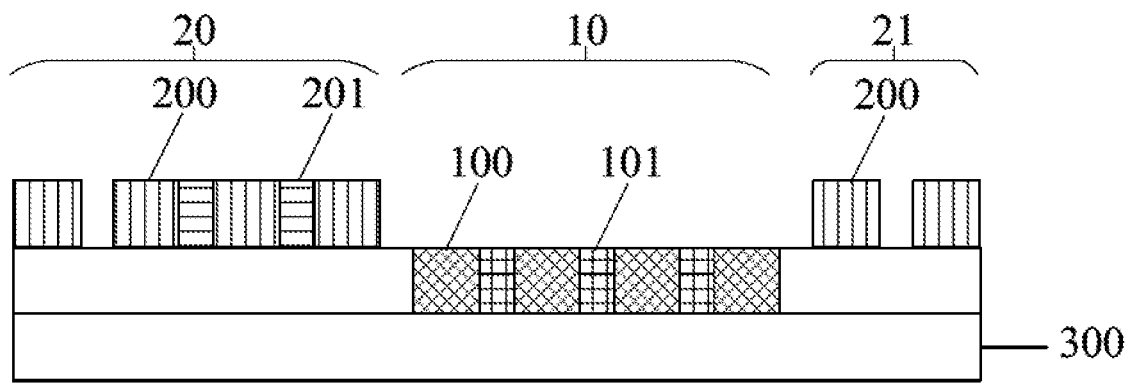
FIG. 3 is a cross-sectional view along A-A' line of the mutual capacitive touch substrate in FIG. 1 in some embodiments according to the present disclosure.

FIG. 3 is a cross-sectional view along A-A' line of the mutual capacitive touch substrate in FIG. 1 in some embodiments according to the present disclosure. Referring to FIG. 3, in some embodiments, the plurality of touch sensing electrode blocks 100, the plurality of touch sensing electrode bridges 101 are in a same first layer. Optionally, the plurality of touch scanning electrode bridges 201, the plurality of touch scanning electrode blocks 200 in the one or more first touch scanning electrodes 20 and the one or more second touch scanning electrodes 21 are in a same second layer. The second layer is different from the first layer.

Figure 4:
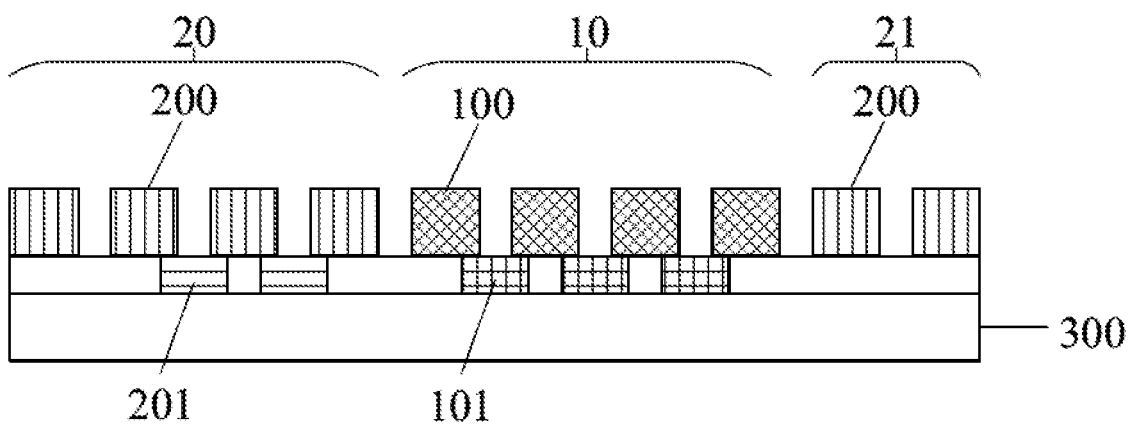
FIG. 4 is a cross-sectional view along A-A' line of the mutual capacitive touch substrate in FIG. 1 in some embodiments according to the present disclosure.

FIG. 4 is a cross-sectional view along A-A' line of the mutual capacitive touch substrate in FIG. 1 in some embodiments according to the present disclosure. Referring to FIG. 4, in some embodiments, the plurality of touch sensing electrode blocks 100, the plurality of touch scanning electrode blocks 200 in the one or more first touch scanning electrodes 20 and the one or more second touch scanning electrodes 21 are in a same first layer. Optionally, the plurality of touch sensing electrode bridges 101 and the plurality of touch scanning electrode bridges 201 are in a same second layer. The second layer is different from the first layer.

Referring to FIG. 1, in some embodiments, the mutual capacitive touch substrate includes a plurality of subpixel areas 30, each of which corresponds to a subpixel in a display panel having the mutual capacitive touch substrate. As shown in FIG. 1, each of the plurality of touch electrode blocks is in one of the plurality of subpixel areas 30. For example, each of the plurality of touch sensing electrode blocks 100 is in one of the plurality of subpixel areas 30, and each of the plurality of touch scanning electrode blocks 200 is in one of the plurality of subpixel areas 30. Optionally, a projection of each of the plurality of touch electrode blocks on the mutual capacitive touch substrate (e.g., a base substrate 300 as shown in FIG. 2) substantially overlaps with a projection of one of the plurality of subpixel areas 30.

Figure 5:
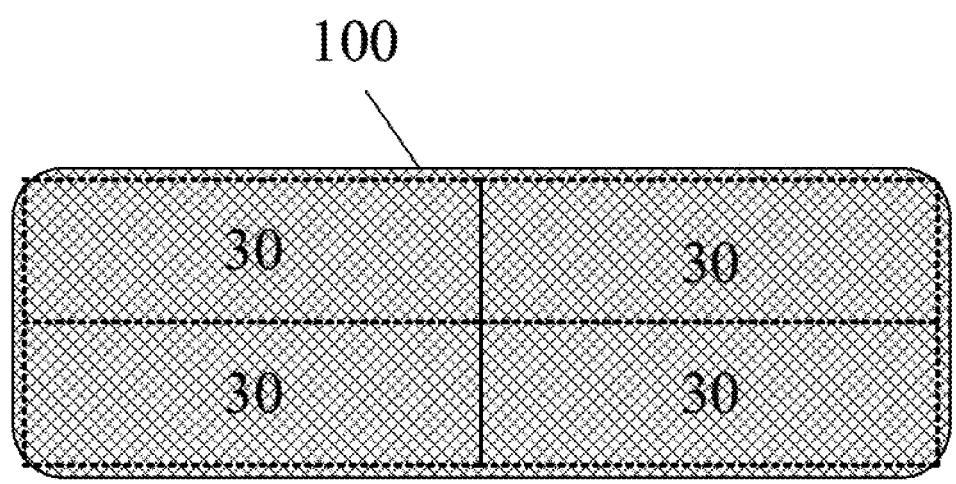
FIG. 5 is a schematic diagram illustrating the structure a touch sensing electrode block in some embodiments according to the present disclosure.

FIG. 5 is a schematic diagram illustrating the structure a touch sensing electrode block in some embodiments according to the present disclosure. Referring to FIG. 5, in some embodiments, each of the plurality of touch electrode blocks is in four of the plurality of subpixel areas 30. For example, each of the plurality of touch sensing electrode blocks 100 is in four of the plurality of subpixel areas 30, and each of the plurality of touch scanning electrode blocks 200 is in four of the plurality of subpixel areas 30. Optionally, a projection of each of the plurality of touch electrode blocks on the mutual capacitive touch substrate (e.g., a base substrate 300 as shown in FIG. 2) substantially overlaps with a projection of multiple subpixel areas of the plurality of subpixel areas 30.

In some embodiments, the touch sensing electrode 10, the one or more first touch scanning electrodes 20, and the one or more second touch scanning electrodes 21 are operated in a time-division driving mode. The time-division driving mode comprises a display mode and a touch control mode. In the display mode, the touch sensing electrode 10, the one or more first touch scanning electrodes 20, and the one or more second touch scanning electrodes 21 are common electrodes for applying a common voltage signal. In the touch control mode, the touch sensing electrode 10, the one or more first touch scanning electrodes 20, and the one or more second touch scanning electrodes 21 are touch control electrodes for conducting touch signals. In one example, during a scanning period of a first frame of image, the touch sensing electrode 10, the one or more first touch scanning electrodes 20, and the one or more second touch scanning electrodes 21 are common electrodes for applying a common voltage signal. After the scanning period of the first frame of image is complete, and before a scanning period of a second frame of image starts, the touch sensing electrode 10, the one or more first touch scanning electrodes 20, and the one or more second touch scanning electrodes 21 are touch control electrodes for conducting touch signals. The second frame of image is later in time than the first frame of image, and the first frame of image and the second frame of image are sequential frames of image.

Figure 6:
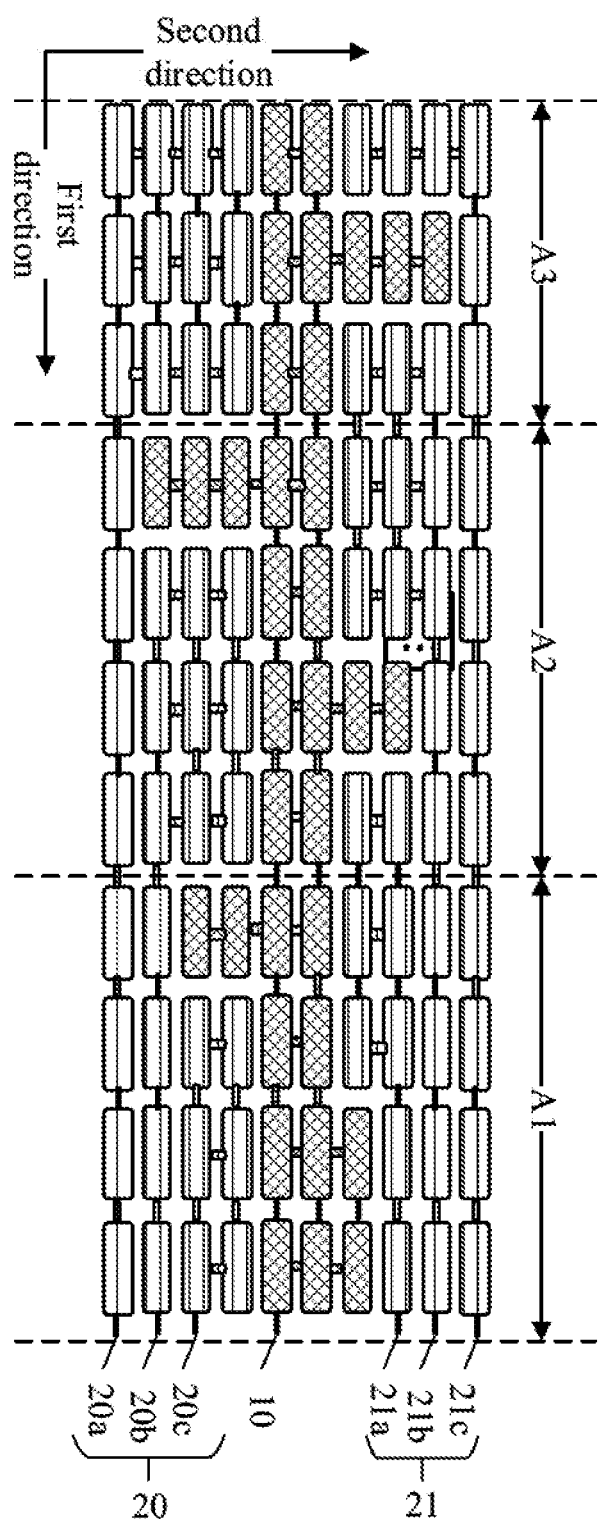
FIG. 6 is a schematic diagram illustrating the structure off touch control repeating unit of a mutual capacitive touch substrate in some embodiments according to the present disclosure.

Referring to FIG. 1, in some embodiments, the touch sensing electrode 10 extends substantially along the first direction. The one or more first touch scanning electrodes 20, the touch sensing electrode 10, the one or more second touch scanning electrodes 21 are arranged substantially along the second direction, e.g., from left to right in FIG. 1. FIG. 6 is a schematic diagram illustrating the structure of a touch control repeating unit of a mutual capacitive touch substrate in some embodiments according to the present disclosure. Referring to FIG. 6, the one or more first touch scanning electrodes 20 includes a first electrode 20a, a second electrode 20b, and a third electrode 20c. The one or more second touch scanning electrodes 21 includes a fourth electrode 21a, a fifth electrode 21b, and a sixth electrode 21c. The first electrode 20a, the second electrode 20b, the third electrode 20c, the touch sensing electrode 10, the fourth electrode 21a, the fifth electrode 21b, and the sixth electrode 21c are sequentially arranged along the second direction, e.g., from left to right in FIG. 1. The first electrode 20a extends substantially along the first direction over a distance substantially the same as the touch sensing electrode 10. The sixth electrode 21c extends substantially along the first direction over a distance substantially the same as the touch sensing electrode 10. The second electrode 20b, the third electrode 20c, the fourth electrode 21a, and the fifth electrode 21b extend substantially along the first direction over a distance less than the touch sensing electrode 10.

Referring to FIG. 6, the touch sensing electrode 10 includes a first portion in a first region A1, a second portion in a second region A2, and a third portion in a third region A3. The first portion in the first region A1, the second portion in the second region A2, and the third portion in the third region A3 are sequentially arranged along the first direction. The first portion in the first region A1 of the touch sensing electrode 10 abuts the third electrode 20c and the fourth electrode 21a. The second portion in the second region A2 abuts the second electrode 20b and the fifth electrode 21b. The third portion in the third region A3 abuts the first electrode 20a and the sixth electrode 21c.

Figure 7:
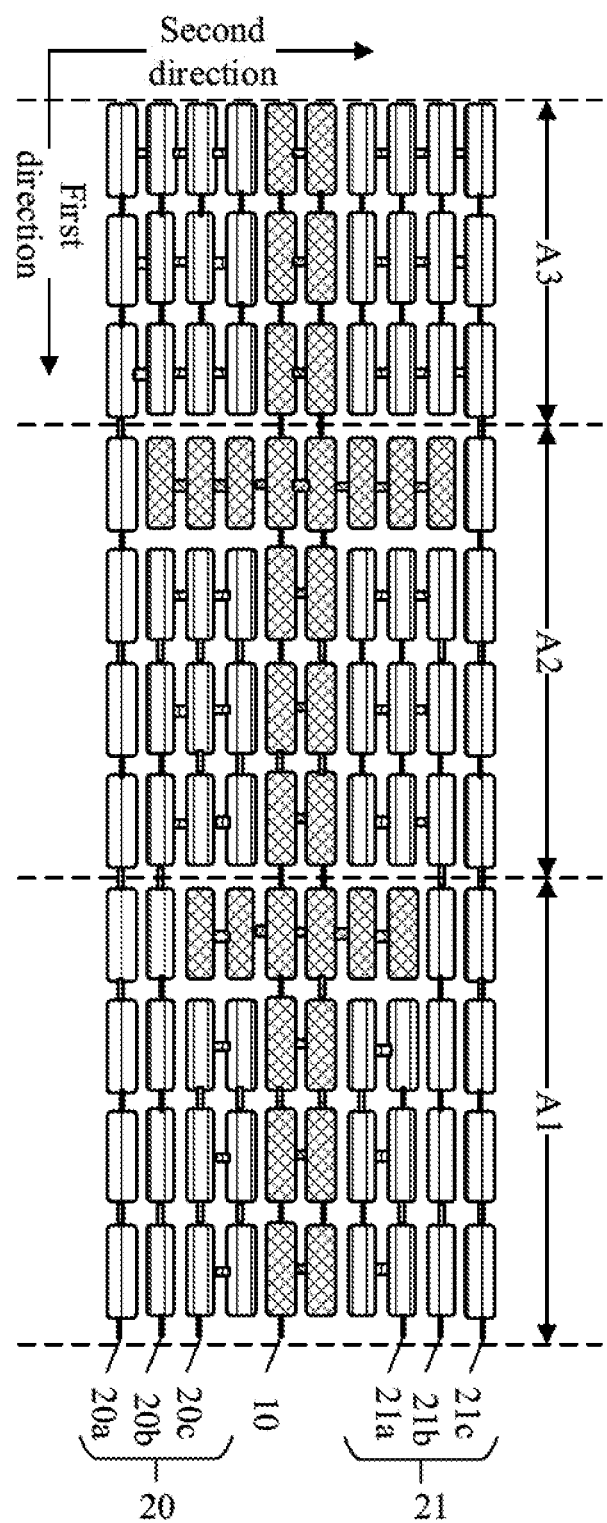
FIG. 7 is a schematic diagram illustrating the structure of a touch control repeating unit of a mutual capacitive touch substrate in some embodiments according to the present disclosure.

FIG. 7 is a schematic diagram illustrating the structure of a touch control repeating unit of a mutual capacitive touch substrate in some embodiments according to the present disclosure. Referring to FIG. 7, the touch control repeating unit has a substantially mirror symmetry. For example, the touch sensing electrode 10 has a substantially minor symmetry. The first touch scanning electrode 20 and the second touch scanning electrode 21 have a substantially mirror symmetry with respect to each other. However, symmetrical electrode layout is not required as shown in FIG. 6.

Figure 8:
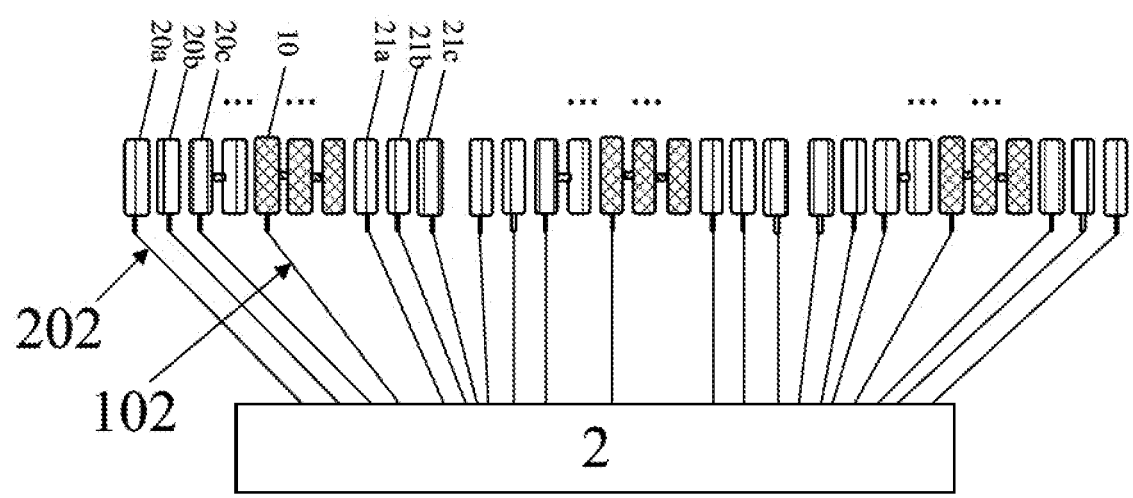
FIG. 8 is a schematic diagram illustrating electrical connection between a plurality of touch signal lines and a driver circuit in some embodiments according to the present disclosure.

FIG. 8 is a schematic diagram illustrating electrical connection between a plurality of touch signal lines and a driver circuit in some embodiments according to the present disclosure. Referring to FIG. 8, the mutual capacitive touch substrate in some embodiments further includes a plurality of touch sensing signal lines 102 and a plurality of touch scanning signal lines 202. The touch sensing electrode 10 is electrically connected to one of the plurality of touch sensing signal lines 102. Each of the one or more first touch scanning electrodes (e.g., the first electrode 20a, the second electrode 20b, and the third electrode 20c) is electrically connected to one of the plurality of touch scanning signal lines 202. Each of the one or more second touch scanning electrodes (e.g., the fourth electrode 21a, the fifth electrode 21b, and the sixth electrode 21c) is electrically connected to one of the plurality of touch scanning signal lines 202. In some embodiments, a ratio between a total number of the plurality of touch sensing signal lines 102 and a total number of the plurality of touch scanning signal lines 202 is 1:2N, N is an integer 1. As shown in FIG. 8, the ratio between a total number of the plurality of touch sensing signal lines 102 and a total number of the plurality of touch scanning signal lines 202 is 1:6. Optionally, the ratio between a total number of the plurality of touch sensing signal lines 102 and a total number of the plurality of touch scanning signal lines 202 is 1:2. Optionally, the ratio between a total number of the plurality of touch sensing signal lines 102 and a total number of the plurality of touch scanning signal lines 202 is 1:4. The plurality of touch sensing signal lines 102 and a plurality of touch scanning signal lines 202 are electrically connected to a driver circuit 2 in an apparatus having the mutual capacitive touch substrate.

In another aspect, the present disclosure provides a mutual capacitive touch panel having the mutual capacitive touch substrate described herein. Optionally, the mutual capacitive touch panel is an add-on type touch panel. Optionally, the mutual capacitive touch panel is a one-glass-solution type touch panel. Optionally, the mutual capacitive touch panel is a glass-film-film type touch panel. Optionally, projections of a plurality of data lines on a base substrate are substantially non-overlapping with projections of the plurality of touch electrode blocks (e.g., the plurality of touch scanning electrode blocks, the plurality of touch scanning electrode blocks of the one or more first touch scanning electrodes, and the plurality of touch scanning electrode blocks of the one or more second touch scanning electrodes).

In another aspect, the present disclosure provides a mutual capacitive touch control display panel having the mutual capacitive touch substrate described herein. Optionally, the mutual capacitive touch control display panel is an on-cell touch control display panel. Optionally, the mutual capacitive touch control display panel is an in-cell touch control display panel. Optionally, the mutual capacitive touch control display panel includes a plurality of subpixels, each of which corresponding to a subpixel area of the mutual capacitive touch substrate. Optionally, each of the plurality of touch sensing electrode blocks is in one of the plurality of subpixels, and each of the plurality of touch scanning electrode blocks is in one of the plurality of subpixels.

In another aspect, the present disclosure provides a mutual capacitive touch control display apparatus having the mutual capacitive touch substrate described herein. Examples of appropriate touch control display apparatuses include, but are not limited to, an electronic paper, a mobile phone, a tablet computer, a television, a monitor, a notebook computer, a digital album, a GPS, etc.

In some embodiments, the mutual capacitive touch control display apparatus further includes a driver circuit for driving image display and touch detection of the mutual capacitive touch control display apparatus (see, e.g., the driver circuit 2 in. FIG. 8). In some embodiments, the driver circuit includes circuitry configured to apply one or more first touch scanning signals respectively to the one or more first touch scanning electrodes.

In some embodiments, the touch sensing electrode, the one or more first touch scanning electrodes, and the one or more second touch scanning electrodes are operated in a time-division driving mode. The time-division driving mode comprises a display mode and a touch control mode. Optionally, the driver circuit includes circuitry configured to apply common voltage signal during the display mode to the touch sensing electrode, the one or more first touch scanning electrodes, and the one or more second touch scanning electrodes and apply one or more first touch scanning signals respectively to the one or more first touch scanning electrodes during the touch control mode.

In some embodiments, the mutual capacitive touch control display apparatus is operated in a first touch detection mode (e.g., a relatively high-resolution touch detection mode). Optimally, the circuitry is configured to apply the one or more first touch scanning signals respectively to the one or more first touch scanning electrodes in a first touch scanning period; and apply one or more second touch scanning signals respectively to the one or more second touch scanning electrodes in a second touch scanning period, the second touch scanning period is later in time than the first touch scanning period. In the first touch scanning period, one or more first touch scanning signals are respectively provided to the one or more first touch scanning electrodes. By determining the locations of the touch sensing electrode and the one or more first touch scanning electrodes that produce the capacitance change, a touch position may be determined to have a first coordinate, e.g., (X1, Y1). In the second touch scanning period, one or more second touch scanning signals are respectively provided to the one or more second touch scanning electrodes. By determining the locations of the touch sensing electrode and the one or more second touch scanning electrodes that produce the capacitance change, the touch position may be determined for the second time to have a second coordinate, e.g., (X2, Y2). Because the touch position for a same touch event is independently determined twice, the touch position can be determined with much enhanced precision.

In some embodiments, the mutual capacitive touch substrate is operated in a second touch detection mode (e.g., a relatively low-resolution touch detection mode). Optionally, the circuitry is configured to apply the one or more first touch scanning signals respectively to the one or more first touch scanning electrodes in a first touch scanning period; and apply one or more second touch scanning signals respectively to the one or more second touch scanning electrodes. In a same touch scanning period, one or more first touch scanning signals are respectively provided to the one or more first touch scanning electrodes, and one or more second touch scanning signals are respectively provided to the one or more second touch scanning electrodes. The one or more first touch scanning signals and the one or more second touch scanning signals are in phase and are applied simultaneously.

In some embodiments, the mutual capacitive touch substrate is operated in a third touch detection mode (e.g., a relatively low-resolution touch detection mode). Optionally, the circuitry is configured to apply the one or more first touch scanning signals respectively to the one or more first touch scanning electrodes in a first touch scanning period; and apply one or more ground signals respectively to the one or more second touch scanning electrodes. In a same touch scanning period, one or more first touch scanning signals are respectively provided to the one or more first touch scanning electrodes, and one or more ground signals are respectively provided to the one or more second touch scanning electrodes. The one or more first touch scanning signals and the one or more ground signals are applied simultaneously.

In another aspect, the present disclosure provides a method of driving the mutual capacitive touch substrate. In some embodiments, the method includes applying one or more first touch scanning signals respectively to the one or more first touch scanning electrodes. Optionally, the one or more first touch scanning signals are applied in a first touch scanning period; and the method further includes applying one or more second touch scanning signals respectively to the one or more second touch scanning electrodes in a second touch scanning period, the second touch scanning period is later in time than the first touch scanning period. Optionally, the method further includes applying one or more second touch scanning signals respectively to the one or more second touch scanning electrodes; the one or more first touch scanning signals and the one or more second touch scanning signals being in phase and applied simultaneously. Optionally, the method further includes applying one or more ground signals respectively to the one or more second touch scanning electrodes; the one or more first touch scanning signals and the one or more ground signals being applied simultaneously.

In some embodiments, the touch sensing electrode, the one or more first touch scanning electrodes, and the one or more second touch scanning electrodes are operated in a time-division driving mode. The time-division driving mode includes a display mode and a touch control mode. Optionally, the method includes applying common voltage signal during the display mode to the touch sensing electrode, the one or more first touch scanning electrodes, and the one or more second touch scanning electrodes; and applying the one or more first touch scanning signals respectively to the one or more first touch scanning electrodes during the touch control mode.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A mutual capacitive touch substrate having a matrix of a plurality of touch electrode blocks along a first direction and a second direction, the plurality of touch electrode blocks grouped into a plurality of touch control repeating units;
   wherein each of the plurality of touch control repeating units comprises a touch sensing electrode, one or more first touch scanning electrodes on a first side of the touch sensing electrode, and one or more second touch scanning electrodes on a second side of the touch sensing electrode, the first side is different from the second side;
   the touch sensing electrode abuts at least a portion of each of the one or more first touch scanning electrodes and at least a portion of each of the one or more second touch scanning electrodes; and
   the plurality of touch control repeating units are electrically insulated from each other;
   wherein the touch sensing electrode, the one or more first touch scanning electrodes, and the one or more second touch scanning electrodes are configured to be operated in a time-division driving mode;
   the time-division driving mode comprises a display mode and a touch control mode;
   the touch sensing electrode, the one or more first touch scanning electrodes, and the one or more second touch scanning electrodes are common electrodes for applying a common voltage signal during the display mode; and
   the touch sensing electrode, the one or more first touch scanning electrodes, and the one or more second touch scanning electrodes are touch control electrodes for conducting touch signals during the touch control mode.

2. The mutual capacitive touch substrate of claim 1, wherein the touch sensing electrode comprises a plurality of touch sensing electrode blocks electrically connected together, each of the one or more first touch scanning electrodes and each of the one or more second touch scanning electrodes comprise a plurality of touch scanning electrode blocks;
   the plurality of touch scanning electrode blocks in each of the one or more first touch scanning electrodes are electrically connected together;
   the plurality of touch scanning electrode blocks in each of the one or more second touch scanning electrodes are electrically connected together;
   the one or more first touch scanning electrodes are electrically insulated from each other; and
   the one or more second touch scanning electrodes are electrically insulated from each other.

3. The mutual capacitive touch substrate of claim 2, wherein at least one of the plurality of touch scanning electrode blocks in each of the one or more first touch scanning electrodes abuts one of the plurality of touch sensing electrode blocks in the touch sensing electrode; and
   at least one of the plurality of touch scanning electrode blocks in each of the one or more second touch scanning electrodes abuts one of the plurality of touch sensing electrode blocks in the touch sensing electrode.

4. The mutual capacitive touch substrate of claim 2, wherein the touch sensing electrode further comprises a plurality of touch sensing electrode bridges electrically connecting the plurality of touch sensing electrode blocks;
   each of the one or more first touch scanning electrodes and each of the one or more second touch scanning electrodes further comprise a plurality of touch scanning electrode bridges;
   the plurality of touch scanning electrode blocks in each of the one or more first touch scanning electrodes are electrically connected together by one or more of the plurality of touch scanning electrode bridges;
   the plurality of touch scanning electrode blocks in each of the one or more second touch scanning electrodes are electrically connected together by one or more of the plurality of touch scanning electrode bridges; and
   the plurality of touch sensing electrode blocks, the plurality of touch sensing electrode bridges, the plurality of touch scanning electrode bridges, the plurality of touch scanning electrode blocks in the one or more first touch scanning electrodes and the one or more second touch scanning electrodes are in a same layer.

5. The mutual capacitive touch substrate of claim 2, comprising a plurality of subpixel areas;
   each of the plurality of touch sensing electrode blocks is in one of the plurality of subpixel areas; and
   each of the plurality of touch scanning electrode blocks is in one of the plurality of subpixel areas.

6. The mutual capacitive touch substrate of claim 1, wherein the touch sensing electrode extends substantially along the first direction; and
the one or more first touch scanning electrodes, the touch sensing electrode, the one or more second touch scanning electrodes are arranged substantially along the second direction.

7. The mutual capacitive touch substrate of claim 6, wherein one of the one or more first touch scanning electrodes extends substantially along the first direction over a distance substantially the same as the touch sensing electrode; and
one of the one or more second touch scanning electrodes extends substantially along the first direction over the distance substantially the same as the touch sensing electrode.

8. The mutual capacitive touch substrate of claim 6, wherein the touch sensing electrode comprises a first portion and a second portion substantially along the first direction;
a first one of the one or more first touch scanning electrodes abuts the first portion of the touch sensing electrode and a second one of the one or more first touch scanning electrodes abuts the second portion of the touch sensing electrode; and
a first one of the one or more second touch scanning electrodes abuts the first portion of the touch sensing electrode and a second one of the one or more second touch scanning electrodes abuts the second portion of the touch sensing electrode.

9. The mutual capacitive touch substrate of claim 8, wherein a ratio between a total number of the plurality of touch sensing signal lines and a total number of the plurality of touch scanning signal lines is 1:2N, N is an integer ≥1.

10. The mutual capacitive touch substrate of claim 6, wherein the one or more first touch scanning electrodes comprise a first electrode, a second electrode, and a third electrode sequentially along the second direction;
the one or more second touch scanning electrodes comprise a fourth electrode, a fifth electrode, and a sixth electrode sequentially along the second direction;
the touch sensing electrode comprises a first portion, a second portion and a third portion sequentially along the first direction;
the third portion abuts the first electrode and the sixth electrode;
the second portion abuts the second electrode and the fifth electrode; and
the first portion abuts the third electrode and the fourth electrode.

11. The mutual capacitive touch substrate of claim 1, further comprising a plurality of touch sensing signal lines and a plurality of touch scanning signal lines;
the touch sensing electrode is electrically connected to one of the plurality of touch sensing signal lines;
each of the one or more first touch scanning electrodes is electrically connected to one of the plurality of touch scanning signal lines; and
each of the one or more second touch scanning electrodes is electrically connected to one of the plurality of touch scanning signal lines.

12. A mutual capacitive touch control display apparatus, comprising the mutual capacitive touch substrate of claim 1.

13. A mutual capacitive touch panel, comprising the mutual capacitive touch substrate of any one of claim 1.

14. A method of driving a mutual capacitive touch substrate having a matrix of a plurality of touch electrode blocks along a first direction and a second direction, the plurality of touch electrode blocks grouped into a plurality of touch control repeating units,
wherein each of the plurality of touch control repeating units comprises a touch sensing electrode, one or more first touch scanning electrodes on a first side of the touch sensing electrode, and one or more second touch scanning electrodes on a second side of the touch sensing electrode, the first side is different from the second side;
the touch sensing electrode abuts at least a portion of each of the one or more first touch scanning electrodes and at least a portion of each of the one or more second touch scanning electrodes; and
the plurality of touch control repeating units are electrically insulated from each other;
wherein the method comprises:
applying one or more first touch scanning signals respectively to the one or more first touch scanning electrodes in a first touch scanning period; and
applying one or more second touch scanning signals respectively to the one or more second touch scanning electrodes in a second touch scanning period, the second touch scanning period is later in time than the first touch scanning period.

15. The method of claim 14, further comprising applying one or more second touch scanning signals respectively to the one or more second touch scanning electrodes;
wherein the one or more first touch scanning signals and the one or more second touch scanning signals are in phase and are applied simultaneously.

16. The method of claim 14, further comprising applying one or more ground signals respectively to the one or more second touch scanning electrodes;
wherein the one or more first touch scanning signals and the one or more ground signals are applied simultaneously.

17. The method of claim 14, wherein the touch sensing electrode, the one or more first touch scanning electrodes, and the one or more second touch scanning electrodes are operated in a time-division driving mode;
the time-division driving mode comprises a display mode and a touch control mode;
the method comprises:
applying common voltage signal during the display mode to the touch sensing electrode, the one or more first touch scanning electrodes, and the one or more second touch scanning electrodes; and
applying the one or more first touch scanning signals respectively to the one or more first touch scanning electrodes during the touch control mode.

18. A driver circuit for driving a mutual capacitive touch control display apparatus comprising a mutual capacitive touch substrate having a matrix of a plurality of touch electrode blocks along a first direction and a second direction, the plurality of touch electrode blocks grouped into a plurality of touch control repeating units,
wherein each of the plurality of touch control repeating units comprises a touch sensing electrode, one or more first touch scanning electrodes on a first side of the touch sensing electrode, and one or more second touch scanning electrodes on a second side of the touch sensing electrode, the first side is different from the second side;
the touch sensing electrode abuts at least a portion of each of the one or more first touch scanning electrodes and at least a portion of each of the one or more second touch scanning electrodes; and the plurality of touch control repeating units are electrically insulated from each other;

wherein the touch sensing electrode, the one or more first touch scanning electrodes, and the one or more second touch scanning electrodes are operated in a time-division driving mode;

the time-division driving mode comprises a display mode and a touch control mode;

the driver circuit comprises circuitry configured to:

apply common voltage signal during the display mode to the touch sensing electrode, the one or more first touch scanning electrodes, and the one or more second touch scanning electrodes; and apply one or more first touch scanning signals respectively to the one or more first touch scanning electrodes during the touch control mode.

\* \* \* \* \*